United States Patent
Belanger et al.

(10) Patent No.: US 10,953,856 B2
(45) Date of Patent: Mar. 23, 2021

(54) DRYER DESIGN FOR A VEHICLE WASH SYSTEM

(71) Applicant: WashMe Properties, LLC, Northville, MI (US)

(72) Inventors: Michael J. Belanger, Northville, MI (US); Barry S. Turner, Novi, MI (US)

(73) Assignee: Belanger, Inc., Northville, MI (US)

( * ) Notice: Subject to any disclaimer, the term of this patent is extended or adjusted under 35 U.S.C. 154(b) by 676 days.

(21) Appl. No.: 15/068,599

(22) Filed: Mar. 13, 2016

(65) Prior Publication Data

US 2017/0057469 A1 Mar. 2, 2017

Related U.S. Application Data

(60) Provisional application No. 62/208,924, filed on Aug. 24, 2015.

(51) Int. Cl.
*B60S 3/00* (2006.01)
*B60S 3/04* (2006.01)
(Continued)

(52) U.S. Cl.
CPC ............. *B60S 3/002* (2013.01); *B29C 41/04* (2013.01); *B29C 49/00* (2013.01); *B60S 3/04* (2013.01);
(Continued)

(58) Field of Classification Search
CPC .... F26B 21/004; F26B 2210/12; B60S 3/002; B60S 3/04; B29L 2022/007;
(Continued)

(56) References Cited

U.S. PATENT DOCUMENTS

| | | | |
|---|---|---|---|
| 2,152,623 A | 4/1939 | Belkap et al. | |
| 2,850,823 A | 9/1958 | Sauer | |

(Continued)

FOREIGN PATENT DOCUMENTS

| | | |
|---|---|---|
| DE | 202013103829 U1 | 11/2014 |
| EP | 0700814 A | 3/1996 |

(Continued)

OTHER PUBLICATIONS

European International Search Report dated Nov. 2, 2016.
EP 16764005.1 Search Report, dated Feb. 3, 2020.

*Primary Examiner* — Jessica Yuen
(74) *Attorney, Agent, or Firm* — Dickinson Wright PLLC

(57) ABSTRACT

A dryer unit for a vehicle wash system including an upper head portion with an air inlet. An impeller having a plurality of vanes rotatably disposed adjacent the air inlet. The impeller configured to rotate in a predetermined direction about an axis of rotation to draw air into the upper head portion through the air inlet. A flow channel formed in the upper head portion around a periphery of the impeller. A cut-off portion located adjacent a discharge area of the flow channel. A body portion disposed generally beneath the upper head portion with respect to a direction of fluid flow through the dryer unit. A plurality of outlet nozzle portions integrally formed with the body portion and in fluid communication with the air inlet. The plurality of nozzle portions configured to direct high velocity air flow toward a vehicle treatment area. At least one of the plurality of nozzles being located above the cut-off portion.

21 Claims, 9 Drawing Sheets

(51) Int. Cl.
    *B29C 41/04*     (2006.01)
    *B29C 49/00*     (2006.01)
    *F26B 21/00*     (2006.01)
    *B29K 75/00*     (2006.01)
    *B29L 22/00*     (2006.01)

(52) U.S. Cl.
    CPC ........ *F26B 21/004* (2013.01); *B29K 2075/00* (2013.01); *B29K 2995/0029* (2013.01); *B29L 2022/007* (2013.01); *F26B 2210/12* (2013.01)

(58) Field of Classification Search
    CPC ........ B29K 2995/0029; B29K 2075/00; B29C 41/04; B29C 49/00
    See application file for complete search history.

(56) References Cited

U.S. PATENT DOCUMENTS

| | | | |
|---|---|---|---|
| 3,808,703 A | | 5/1974 | Kamiya |
| 4,090,178 A | | 5/1978 | Norris |
| 4,622,714 A | | 11/1986 | Tomasello |
| 4,809,392 A | | 3/1989 | Larson et al. |
| 4,848,670 A | | 7/1989 | Belanger et al. |
| 4,882,826 A | * | 11/1989 | Belanger .......... A47L 5/22 29/527.1 |
| 4,979,316 A | * | 12/1990 | Belanger .......... B60S 3/002 15/316.1 |
| 5,221,538 A | | 6/1993 | Gasami et al. |
| 5,553,346 A | | 9/1996 | McElroy |
| 5,960,564 A | * | 10/1999 | McElroy .......... B60S 3/002 15/316.1 |
| 6,123,503 A | * | 9/2000 | Belanger .......... B60S 3/002 415/127 |
| 6,176,024 B1 | | 1/2001 | McElroy |
| 6,709,530 B1 | | 3/2004 | Dietsch et al. |
| 8,539,968 B2 | | 9/2013 | Turner et al. |
| 8,819,887 B2 | | 9/2014 | Belanger et al. |
| 2003/0205092 A1 | | 11/2003 | McElhanon et al. |
| 2008/0232958 A1 | | 9/2008 | Weyandt |
| 2010/0192991 A1 | | 8/2010 | Belanger et al. |
| 2011/0277792 A1 | | 11/2011 | Turner |
| 2011/0277797 A1 | | 11/2011 | Turner et al. |
| 2013/0185876 A1 | | 7/2013 | Belanger |
| 2015/0274134 A1 | | 10/2015 | Turner et al. |
| 2016/0059831 A1 | | 3/2016 | Belanger et al. |
| 2016/0063591 A1 | | 3/2016 | Belanger et al. |

FOREIGN PATENT DOCUMENTS

| | | | | |
|---|---|---|---|---|
| EP | 1364847 A2 | | 11/2003 | |
| GB | 690172 A | * | 4/1953 | ............. F26B 13/10 |
| JP | H1159341 A | | 3/1999 | |

* cited by examiner

DRYER DESIGN FOR A VEHICLE WASH SYSTEM

CROSS-REFERENCE TO RELATED APPLICATIONS

The present application claims priority to U.S. Provisional Patent Application Ser. No. 62/208,924, entitled "Vehicle Wash Dryer Assembly", filed Aug. 24, 2015, which is hereby incorporated by reference as though set forth fully herein.

TECHNICAL FIELD

The present disclosure relates generally to a dryer unit for a vehicle wash system. More specifically, the present disclosure relates to a dryer unit for a vehicle wash system having improved water removal capabilities.

BACKGROUND OF THE DISCLOSURE

Automated systems for washing automotive vehicles have become popular as a way of quickly and efficiently washing a vehicle. The systems have assumed numerous configurations including tunnel-type washes wherein a plurality of wash apparatus are longitudinally aligned for sequential washing of a vehicle that is conveyed therealong. Another common form of automatic system is a gantry-type system wherein the vehicle remains stationary and the wash apparatus is reciprocated back and forth across the vehicle. In a gantry-type wash system, different wash operations are performed in each pass of the apparatus along the length of the vehicle to effectuate the cleaning process.

In any automated wash system, it is desirable to dry the vehicle after it has been washed and rinsed. The conventional systems for drying vehicles consist of multiple air blowers. Such blowers have assumed numerous configurations with the most common blowers being fixed relative to the vehicle to direct air generally horizontally at the sides of the vehicle and downwardly onto the top of the vehicle. As with the washing of the vehicle, the vehicles are moveable relative to the blowers so the drying occurs as the vehicle is relatively moved past the blowers.

Current dryer configurations consist of a large blower unit having a single air inlet and a plurality of air outlets. The blower unit typically includes a plastic housing and generally utilizes an impeller disposed in the air inlet to draw air into the housing. Due to the velocity requirements of existing wash dryer units, the air outlets are all disposed lower than or beneath the impeller unit. The coverage area serviced by existing dryer units is thus limited. To provide a greater coverage area, the dryer unit would need to be made significantly larger, which is undesirable and not practical. Another possible solution to provide sufficient water removal capabilities is to employ additional drying units as part of the wash system. However, this requires significant additional cost or additional conveyor space, which is often not available. Another possible solution includes increasing the velocity at which the dryer units operates. This also increases the cost to operate and the system and yields a significant increase in the noise level, which is undesirable.

As will be appreciated, there is a need for an improved dryer unit for automotive car wash systems that provides increased drying capabilities.

SUMMARY OF THE DISCLOSURE

It is therefore and aspect of the present disclosure to provide a dryer unit for a vehicle wash system that provides improved drying capabilities.

It is another aspect of the present disclosure to provide a dryer unit for a vehicle wash system that provides improved dryer performance without a significant increase in the cost of operation.

It is still another aspect of the present disclosure to provide a dryer unit for a vehicle wash system that provides improved dryer performance without requiring additional space along the conveyor.

It is yet another aspect of the present disclosure to provide a dryer unit for a vehicle wash system that provides improved dryer performance without significantly impacting noise levels within the wash system.

In accordance with the above and the other aspects of the present disclosure, a dryer unit for a vehicle wash system is provided. The dryer unit includes an upper head portion with an air inlet formed therein. The upper head portion has an impeller rotationally disposed therein, which is located adjacent the air inlet. The impeller is configured to rotate in a predetermined direction about an axis of rotation to draw air into the upper head portion through the air inlet. The upper head portion includes a flow channel formed around a periphery of the impeller. The impeller includes a cut-off portion which is the area of the upper head portion located closest to the tips of the impeller blades. A body portion is disposed generally beneath the upper head portion with respect to a direction of fluid flow through the dryer unit. The body portion includes a plurality of outlet nozzle portions integrally formed therewith. The nozzles are in fluid communication with the air inlet and emit high velocity air flow toward a vehicle treatment area. At least one of the plurality of nozzles is located above the cut-off portion.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE INVENTION

Figure 1:
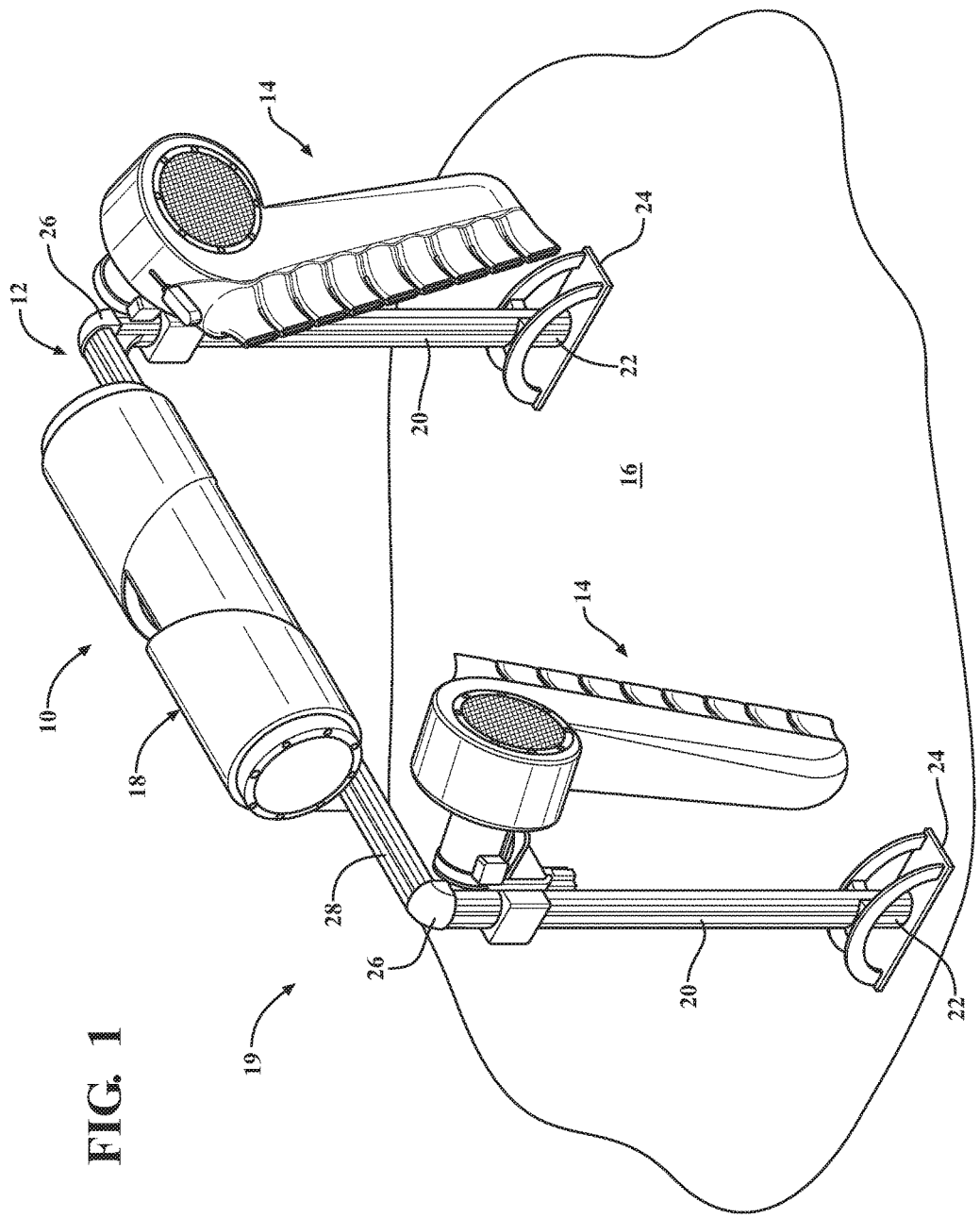
FIG. 1 is a perspective view of a dryer assembly for a vehicle wash system according to an aspect of the present disclosure.
Figure 2:
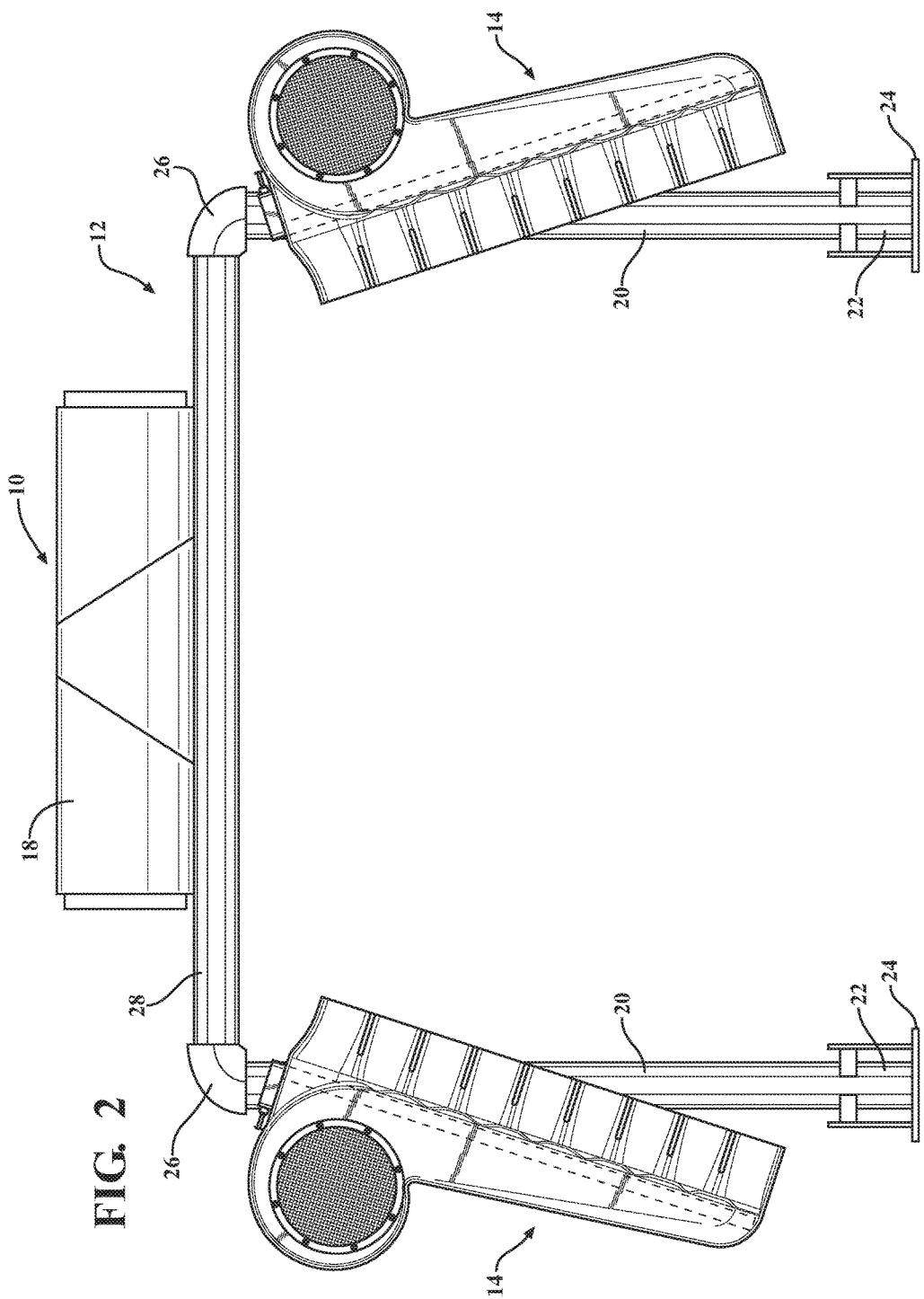
FIG. 2 is a front view of a dryer assembly for a vehicle wash system as viewed in a direction of vehicle travel according to an aspect of the present disclosure.
Figure 3:
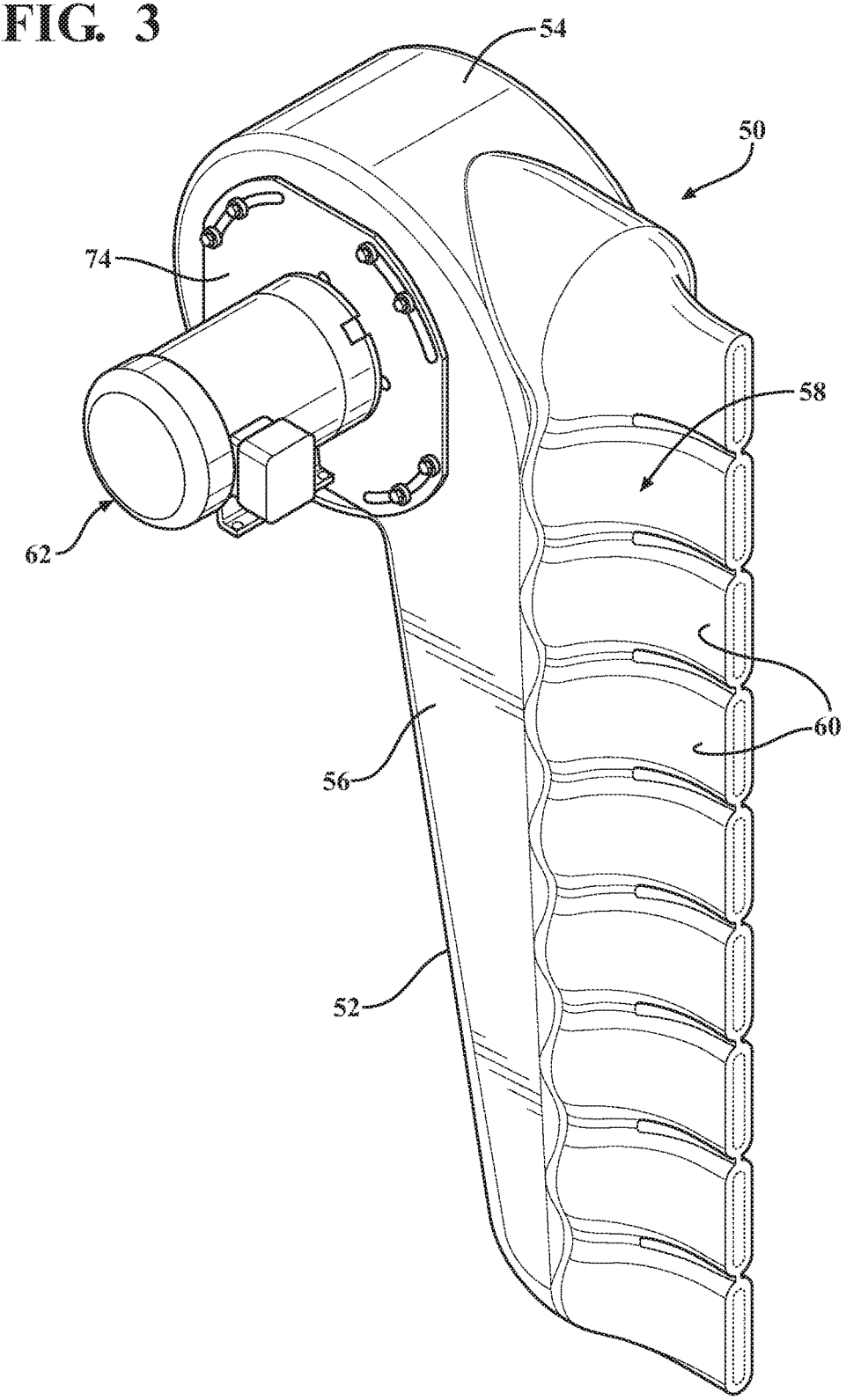
FIG. 3 is a perspective view of a dryer unit of a dryer assembly for a vehicle wash system according to an aspect of the present disclosure.
Figure 4:
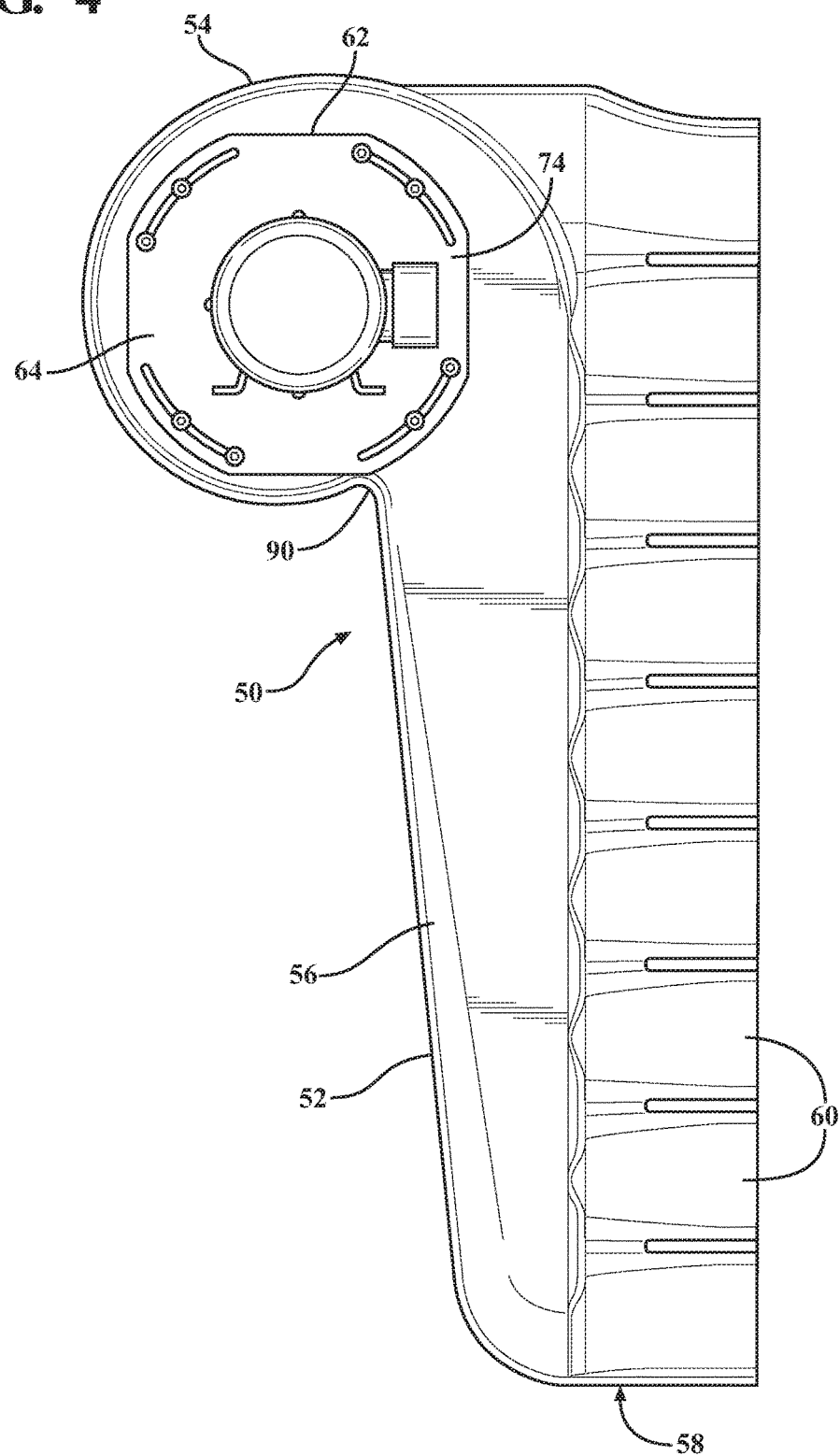
FIG. 4 is front view of the dryer unit of FIG. 3.
Figure 5:
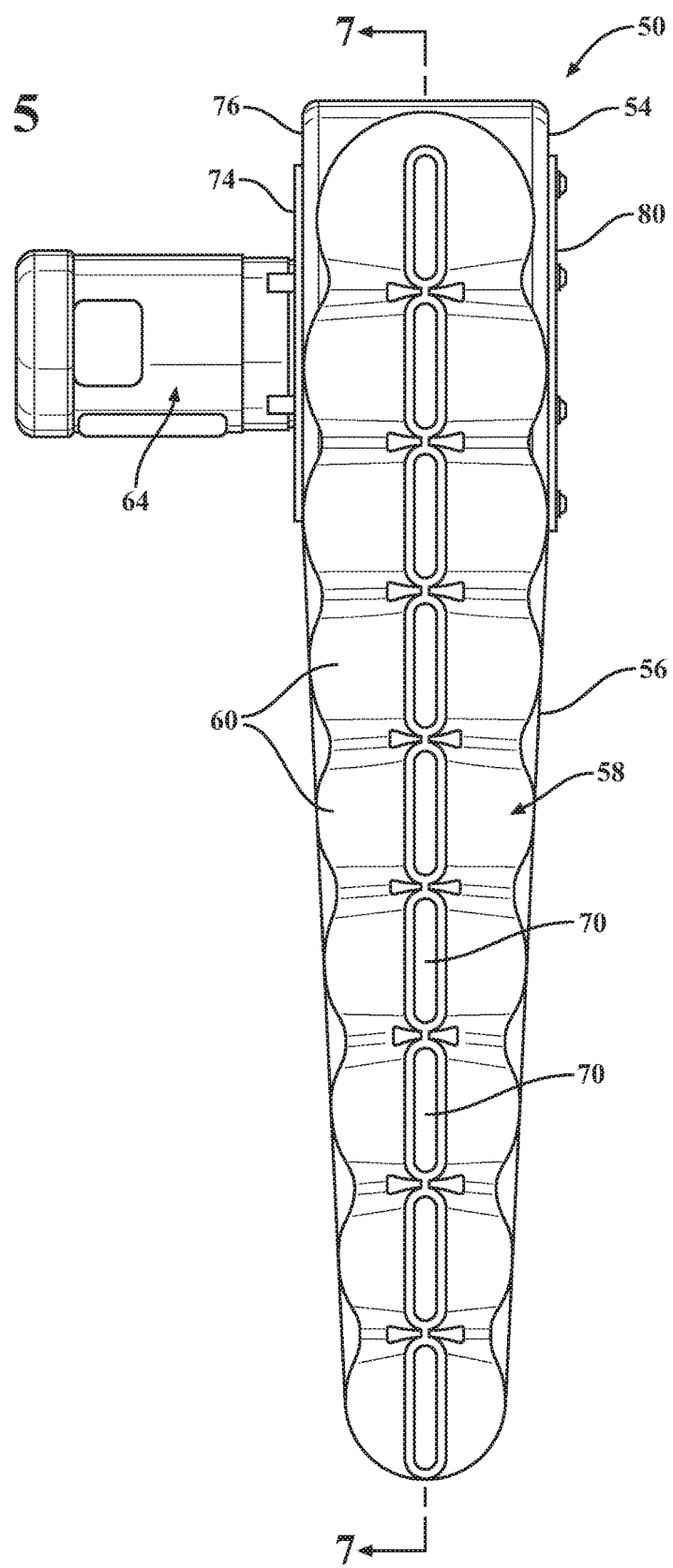
FIG. 5 is a side view of the dyer unit of FIG. 3.
Figure 6:
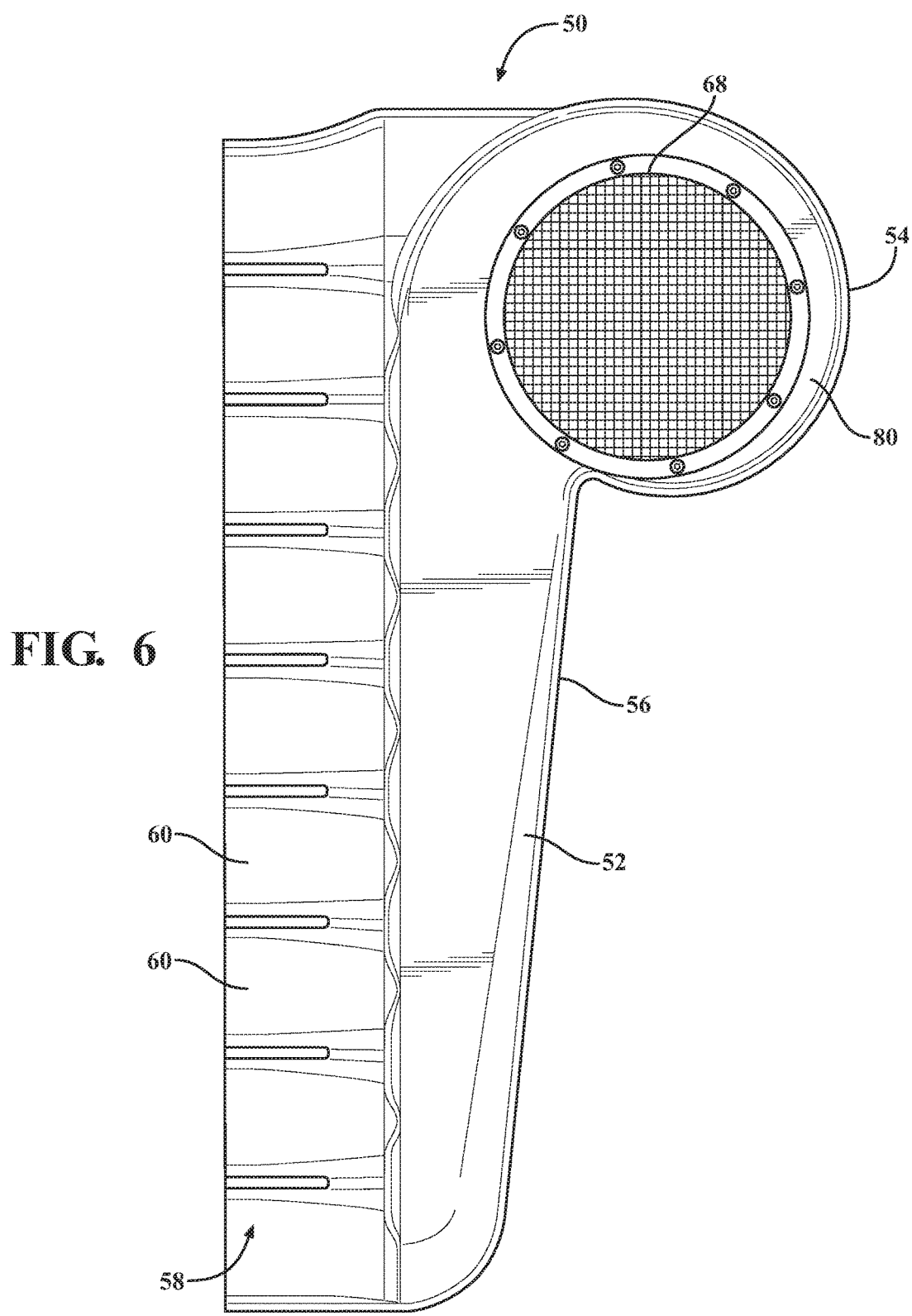
FIG. 6 is a rear view of the dryer unit of FIG. 3.
Figure 7:
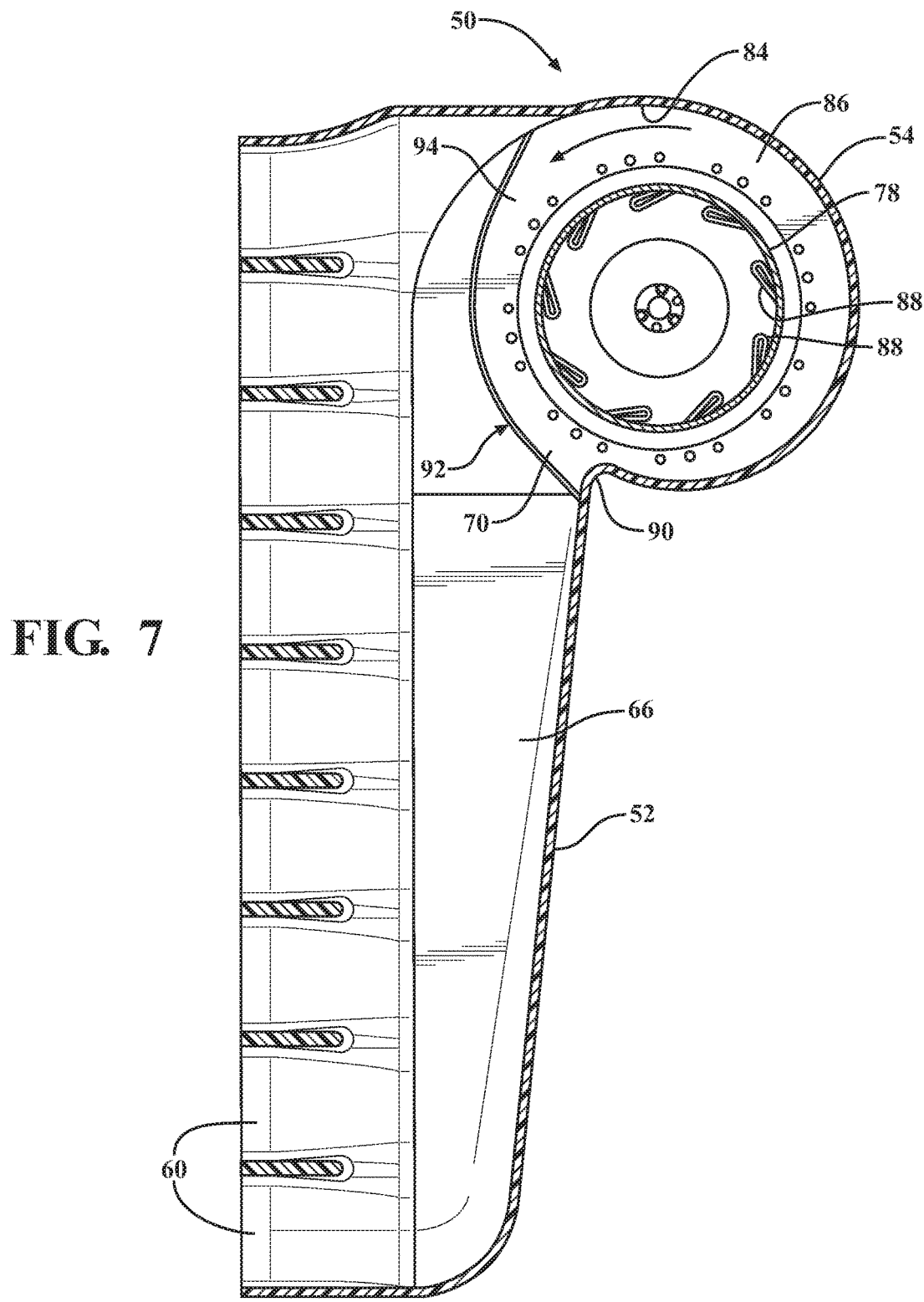
FIG. 7 is a cross-sectional view of the dryer unit of FIG. 5 in the direction of the arrows designated 7-7.

According to an aspect, the present disclosure relates to a treatment component for a vehicle wash system. More specifically, the present disclosure relates to a dryer assembly 10 for use in removing excess water from an exterior surface of a vehicle as part of a vehicle wash process.

According to an aspect, the dryer assembly 10 may emit high velocity air onto a vehicle exterior to remove excess water therefrom. According to a further aspect, the dryer assembly 10 may be configured to emit water and air in order to remove water and/or soap from a vehicle exterior. An exemplary device for emitting water and air is disclosed in Applicant's co-pending U.S. patent application Ser. No. 14/673,157, filed Mar. 30, 2015, and entitled "Vehicle Treatment Apparatus that Emits Air and Water", which is hereby incorporated by reference herein.

According to an aspect, the dryer assembly 10 may be utilized as part of a vehicle wash system. It will be appreciated that the vehicle wash system may be configured as a tunnel car wash where a vehicle is conveyed through the wash process by a conveyor or the like as is known in the art. Alternatively, the vehicle wash system may be configured as a roll-over type system where the vehicle remains stationary and the various treatment components may be translated and/or moved with respect to the vehicle to perform the vehicle wash process. The disclosed dryer assembly may be employed in connection with other suitable wash processes and systems as are known. According to an aspect, the vehicle wash system may be housed within a vehicle wash facility having an entrance end where a vehicle enters, an exit end where the vehicle leaves, and a vehicle treatment area where the vehicle is cleaned. It will be appreciated that the disclosed dryer assembly 10 could also be employed in connection with a variety of other applications outside of a vehicle wash system, such as a manual wash or self-serve wash process.

According to a further aspect, an exemplary vehicle wash system into which the disclosed component may be incorporated can include a plurality of vehicle wash components that engage and/or treat the exterior of a vehicle as it passes through the vehicle wash facility to effectuate a vehicle wash process. For example, the components can include a rinse arch, which sprays water onto a vehicle to wet the exterior surface for further processing. Another component can include a bubble device that generates bubbles and emits them directly onto a vehicle exterior in order to provide a supply of soap for cleaning purposes. Other components may include one or more top brushes for contacting a top exterior surface of a vehicle, a plurality of side brushes for contacting side exterior surfaces of a vehicle and a plurality of wrap brushes for contacting front and back surfaces of a vehicle. Another component may include wheel scrubbers for engaging vehicle wheels. According to a further aspect, the system can include a wheel polishing device for treating vehicle wheels.

It will be appreciated that more, less or different wash components may be employed. Additionally, multiples of the same components may be employed as part of the system, as desired. Further, the components may take on a variety of different configurations. Moreover, the order, placement and sequence of the components within the system may also vary. According to an aspect, the components may be designed to engage and/or treat a vehicle disposed within the vehicle treatment area of the vehicle wash facility.

With reference to FIG. 1, the dryer assembly 10 can include a frame portion 12, a pair of side blower assemblies 14, which are disposed on the frame portion 12 on either side of a vehicle treatment area 16 to direct air onto side vehicle surfaces, and an overhead blower assembly 18 disposed on the frame 12 to direct air onto an upper exterior surface of a vehicle in the vehicle treatment area 16. The dryer assembly 10 may be disposed at or adjacent an exit end 19 of the vehicle treatment area 16. According to an aspect, the frame portion 12 can include a pair of leg portions 20, which are disposed on either side of the vehicle treatment area 16. Each leg portion 20 can include a lower end portion 22, which can engage a base portion 24 that rests on the ground to hold the leg portions 20 in a generally vertical position. The leg portions 20 can each also include an upper end portion 26 which can engage an overhead cross-piece portion 28 that spans the vehicle treatment area 16. It will be appreciated that the dryer assembly 10 and the frame portion 12 can take on a variety of different configurations. It will also be appreciated that more or less or differently configured blower assemblies 14, 18 may be employed on the frame portion 12 and that they may be disposed in different locations on the frame portion 12.

FIGS. 3 through 7 schematically illustrate a dryer unit 50 for a dryer assembly 10 in accordance with an aspect of the disclosure. According to an aspect, the dryer unit 50 can include a housing 52 with an upper head portion 54, a body portion 56, and an outlet portion 58 including a plurality of individual nozzle portions 60. According to an aspect, the dryer housing 52 may be a single integral structure that is formed from a plastic material in a rotational molding process. It will be appreciated that the housing 52 may be formed from a variety of different materials and that a variety of other suitable processes may be employed. According to a still further aspect, the housing 52 may be formed of polyurethane or any of a variety of other suitable materials. Additionally, the housing 52 may be formed in a variety of different colors. It will also be appreciated that the housing 52 can have a variety of different shapes and configurations.

According to a further aspect, the upper head portion 54 can include a motor assembly opening 62 for receipt of a motor unit 64. The motor assembly opening 62 may be in communication with an interior blower cavity 66 disposed in the body portion 56 by way of an inlet opening 68. According to an aspect, the blower cavity 66 may serve as an air passageway that conveys air from the motor unit 64 toward a lower portion of the housing 52 in a direction generally indicated by arrow B. The interior blower cavity 66 may be in communication with each of the plurality of nozzle portions 60. According to another aspect, the nozzle portions 60 may be configured to generally taper outwardly from the body portion 56 to an air exit outlet 70. According to an aspect, the air exit outlets 70 each have an area that is substantially smaller than the size of an area of the inlet opening 68. It will be appreciated that the nozzle portions 60 can have a variety of other configurations.

According to an aspect, the motor unit 64 may be in communication with a mount plate 74 which may be employed to secure the motor unit assembly 62 to a first side 76 of the upper head portion 54 of the blower housing 52. According to an aspect, the motor unit 64 may include a high speed impeller 78. According to a further aspect, in operation, upon actuation of the motor unit 64, the impeller 78 may be caused to rotate to draw air into the second side 80 of the upper head portion 32. The impeller 78 can rotate in a direction generally indicated by arrow B. An air inlet portion may be secured to the second side 80 of the upper head portion 54. The air inlet portion may have a mesh layer 82 disposed over an air inlet opening to prevent large objects from being drawn into the upper head portion 54 through the air inlet. According to another aspect, the motor unit 74 may be an electric motor that is in communication with a source of power. However, a variety of other suitable types of motors or other power sources may be employed.

According to an aspect, the impeller 78 may be disposed in the upper head portion 54. The impeller 78 includes blades the tips of which are disposed a distance from an interior wall 84 of the upper head portion 54 such that a flow channel 86 is created therein. The flow channel 86 extends generally around the entirety of the blades 88 of the impeller 78. According to an aspect, a cut-off 90 is disposed adjacent a discharge area 92. As is known, the cut-off 90 is the part of the motor unit 64 which is closest to the impeller blade tips. The cut-off 90 is designed to assist in conveying fluid brought into the housing to the outlet portion 58 as opposed to continuing to circle within the flow channel 86. As shown and as is known, the flow channel 86 expands from the cut-off 90 in the direction of fluid flow. In operation, as the impeller 78 rotates about an axis of rotation, air enters through the inlet opening 68 travels through the flow channel 86 and exits at the discharge area 92 for communication with the outlet portion 58 and the nozzle portions 60. A mesh protector 94 may also be disposed adjacent the discharge area 92.

According to an aspect and as shown, the plurality of nozzle portions 60 may be oriented parallel to one another in a generally vertical orientation. The nozzle portions 60 may disposed along an entire length of the housing 52 from an upper surface disposed at the top of the upper head portion 54 to a lower surface disposed at the bottom of the housing 52. According to an aspect, a plurality of nozzle portions 60 are disposed above the cut-off 90. With existing blower units, air outlets were only disposed beneath the cut-off 90 so as to ensure that there is sufficient air flow and flow velocity out of each of the units. This obviously decreases the effective coverage area available with existing blower units.

According to an aspect, the dryer unit 50 can have at least three nozzles 60 disposed above the cut-off 90. According to another aspect, locating additional nozzles above the cut-off 90 does not negatively affect air flow or velocity. On the other hand, the ability to include additional nozzles on a dryer unit 50 of substantially the same height as existing dryer units can provide significantly increased dryer performance by providing an increased coverage area. It will be appreciated that different numbers of nozzles 60 may be utilized and that different numbers may be disposed above the cut-off 90. The utilization of nozzles 60 above the cut-off 90 allows for air to be directed higher upon on an exterior surface of a vehicle in a single pass. It will be appreciated that the nozzles 60 may be disposed entirely along a side of the housing.

Figure 8:
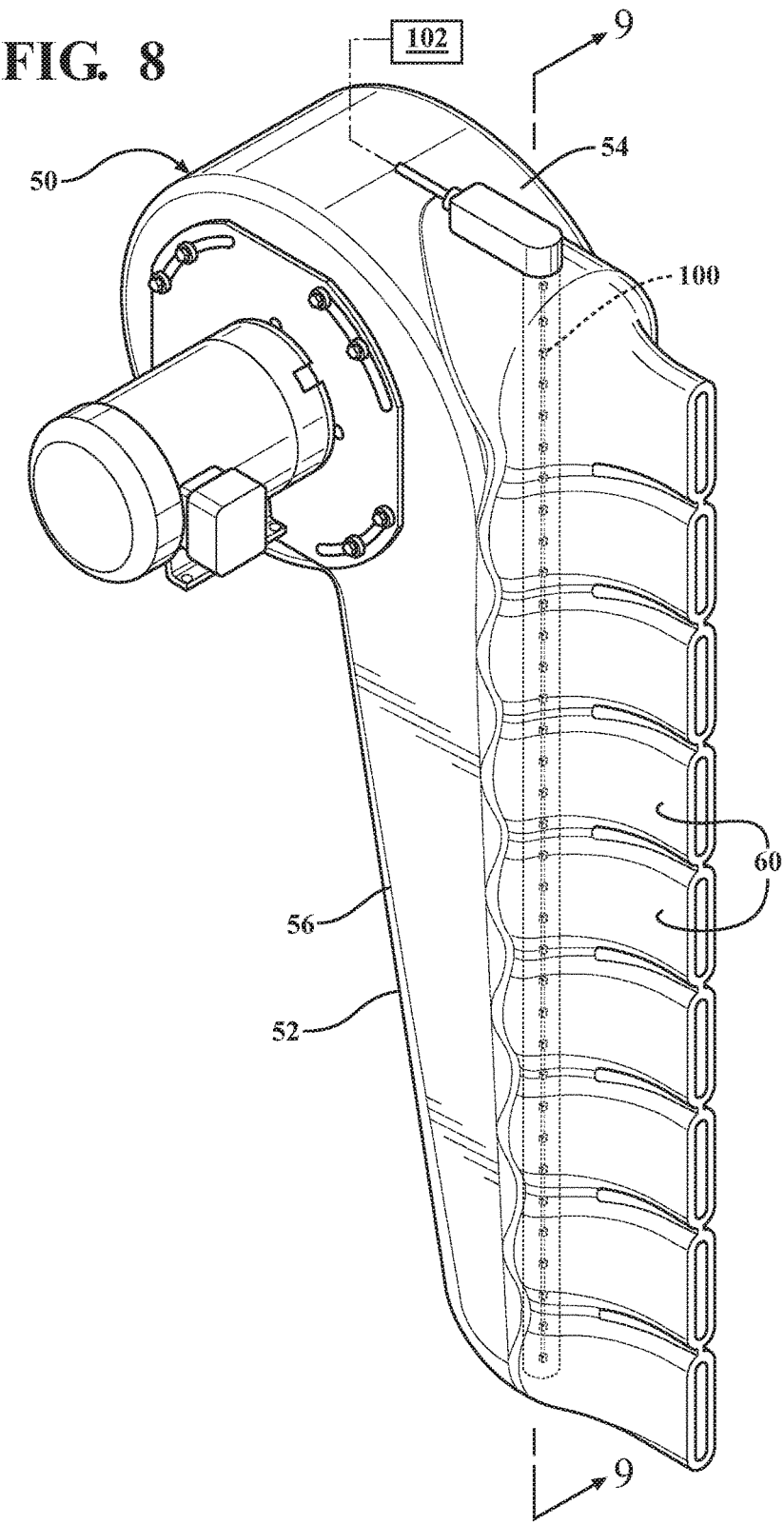
FIG. 8 is a perspective view of a dryer unit for a dryer assembly of a vehicle wash system according to another aspect of the disclosure.
Figure 9:
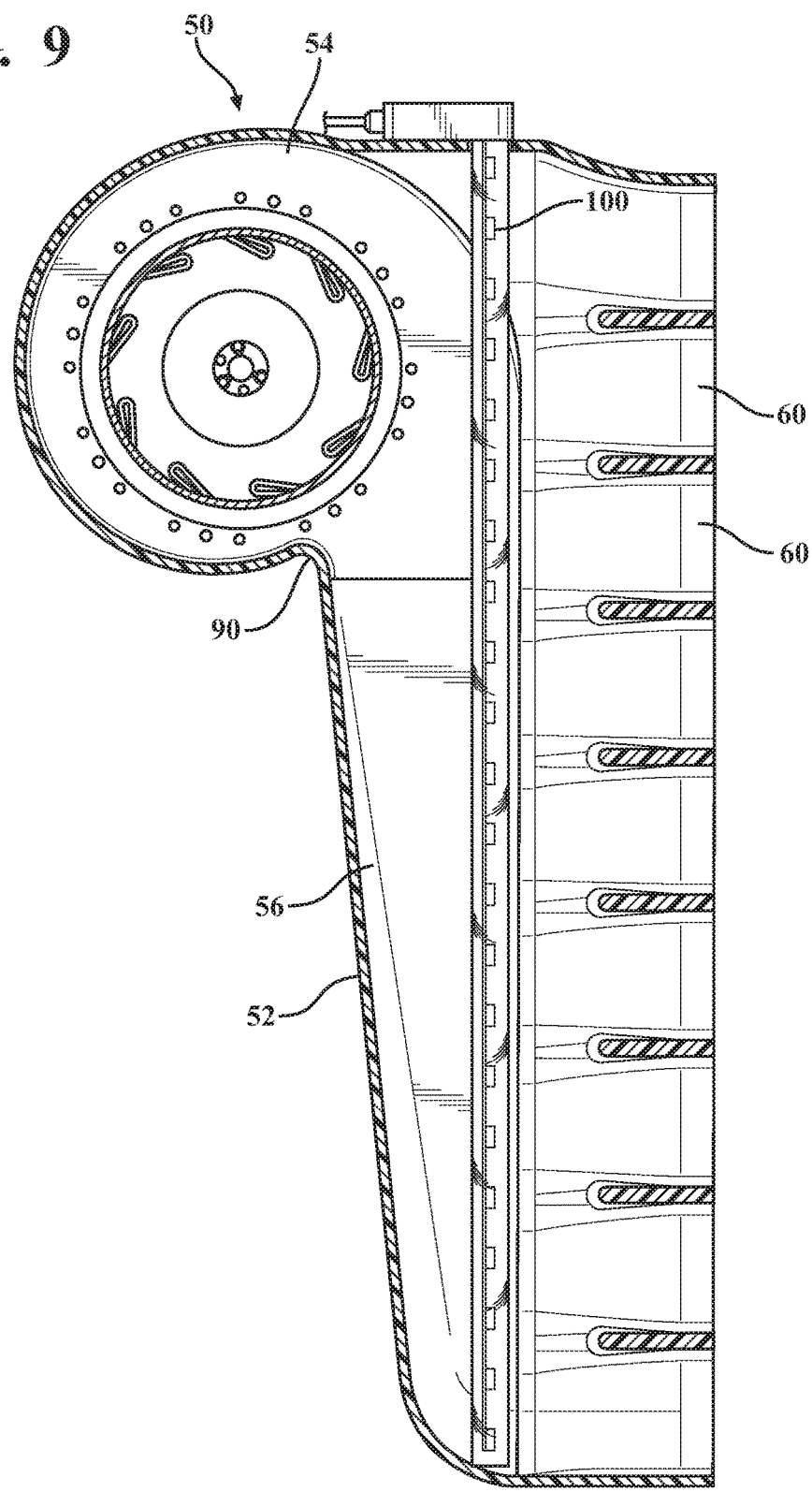
FIG. 9 is a cross-sectional view of the dryer unit of FIG. 8 in the direction of the arrows designated 8-8.

According to another aspect and with reference to FIGS. 8 and 9, an illumination source 100 may be associated with the housing 52 in order to provide aesthetically pleasing effects as well as to convey information to vehicle owners. According to an aspect, the housing 52 may be formed in a rotational molding process with a wall thickness sufficient to withstand air pressure in the housing interior that is sufficient to remove water from the vehicle exterior, but not too thick to prevent light from passing through the housing 52. According to a further aspect, the illumination source 100 may be located within the interior of the housing 52 and light emitted therefrom may pass through the housing 52. According to this aspect, the housing may be formed of a translucent or transparent material. The illumination source 100 may be an array of light emitting diodes (LEDs); however a variety of other suitable illumination sources may be employed. According to an aspect, the illumination sources may be LEDs that are configured to emit light in accordance with the RGB color convention as directed by a controller 102. For example, the illumination source 100 may be directed to emit a variety of different colors. The illumination source 100 could be disposed in the housing 52 in a variety of different ways.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A dryer unit for a vehicle treatment system, comprising:
a head portion having an air inlet formed therein;
an impeller having a plurality of vanes rotatably disposed in the head portion adjacent the air inlet, the impeller configured to rotate in a predetermined direction about an axis of rotation to draw air into the head portion through the air inlet and to create an air flow;
a flow channel formed in the head portion around a periphery of the impeller;
a cut-off segment located adjacent a discharge area of the flow channel;
a body portion disposed generally opposite the head portion and downstream with respect to a direction of fluid flow through the dryer unit, the body portion extending generally in a vertical direction away from the head portion to a lower portion, the vertical direction being generally perpendicular to the axis of rotation of the impeller; and
an outlet nozzle portion integrally formed with the body portion, the outlet nozzle portion in fluid communication with the air inlet and configured to direct the high velocity air flow toward a vehicle exterior surface;
wherein a top of the outlet nozzle portion is substantially aligned with a top of the head portion in the vertical direction, wherein at least a portion of the outlet nozzle portion is disposed above and below the cut-off segment in the vertical direction, and wherein the entire outlet nozzle portion is disposed below the top of the head portion in the vertical direction.

2. The dryer unit of claim 1, wherein the head portion, the body portion and the outlet nozzle portion are part of an integral housing; and
wherein the housing is constructed of a polyurethane material.

3. The dryer unit of claim 1, wherein the outlet nozzle portion includes a plurality of nozzle segments and wherein at least one of the nozzle segments is disposed above the cut-off segment and wherein at least one of the nozzle segments is disposed below the cut-off segment in the vertical direction.

4. The dryer unit of claim 3, further including a plurality of nozzle segments below the cut-off segment and a plurality of nozzle segments above the cut-off segment in the vertical direction.

5. The dryer unit of claim 4, wherein the plurality of nozzle segments extend substantially from an upper portion to the lower portion of the body portion.

6. The dryer unit of claim 3, further comprising:
at least one light source associated with the body portion and wherein the at least one light source is configured to emit light in a plurality of different colors.

7. The dryer unit of claim 6, wherein the body portion is constructed of a translucent material and the at least one light source is disposed in an interior of the body portion to emit light through the body portion.

8. A dryer assembly for a vehicle treatment system, comprising:
a frame portion having at least one leg portion extending in a vertical direction between a lower end portion for engaging a ground and an upper end portion for being spaced from the ground;
at least one dryer unit having a housing with an inlet opening and a plurality of nozzles being positioned in parallel relationship with one another and aligned with one another generally in the vertical direction;
a rotatable impeller disposed in a flow channel in a head portion of the housing, the flow channel having a cut-off segment;
the rotatable impeller being rotatable about an axis of rotation, the axis of rotation being generally perpendicular to the vertical axis; and
at least one of the plurality of nozzles being disposed above the cut-off segment with respect to the vertical direction and at least one of the plurality of nozzles being disposed below the cut-off segment with respect to the vertical direction;
wherein a top of the plurality of nozzles is substantially aligned with a top of the head portion in the vertical direction, and wherein the plurality of nozzles are located entirely below the top of the head portion in the vertical direction.

9. The dryer assembly of claim 8, wherein the inlet opening is located in the head portion of the housing, wherein the head portion has a generally circular configuration and is disposed in an upper portion of the dryer unit.

10. The dryer assembly of claim 9, further comprising:
a body portion having an interior channel that is integral with and disposed below the head portion.

11. The dryer assembly claim of 8, wherein the plurality of nozzles are integrally formed with the housing and extend along a height of the housing.

12. The dryer assembly of claim 11
wherein a plurality of the nozzles are disposed above the cut-off segment in the vertical direction.

13. The dryer assembly of claim 12
wherein a plurality of the nozzles are disposed beneath the cut-off segment in the vertical direction.

14. The dryer assembly of claim 13, wherein the plurality of nozzles are disposed along an entire length of the housing.

15. The dryer assembly of claim 8, wherein the housing is constructed of a translucent material and includes at least one light source disposed therein, the light source being configured to emit light through the housing.

16. The dryer assembly of claim 8, wherein the housing is constructed of a polyurethane material.

17. A dryer unit for a vehicle treatment system, comprising:
a housing having a front side, a rear side, a side portion configured to be disposed adjacent a vehicle treatment area, an upper portion and a lower portion;
the side portions extending generally in a vertical direction between the upper and lower portions;
a head portion disposed in the upper portion of the housing, the head portion having an air inlet opening formed therein, and having a top in the vertical direction;
an impeller disposed in the air inlet opening and configured to rotate about an axis of rotation being generally perpendicular to the vertical direction and to draw air into the housing through the air inlet opening;
a flow channel formed in the upper head portion around a periphery of the impeller, the flow channel having a cut-off segment where the inner surface of the head portion is closest to a periphery of the impeller; and
at least one nozzle portion being integrally formed with the housing, the at least one nozzle portion being disposed along the side portion substantially from the upper portion to the lower portion of the housing, and wherein the at least one nozzle portion is located above and below the cut-off segment, and entirely below the top of the head portion in the vertical direction; and
wherein a top of the outlet nozzle portion is substantially aligned with the top of the head portion in the vertical direction.

18. The dryer unit of claim 17, wherein the housing is constructed of a polyurethane material.

19. The dryer unit of claim 17, wherein the housing is constructed of a translucent material.

20. The dryer unit of claim 17, further comprising:
at least one light source disposed in an interior of the housing and configured to emit light through the housing.

21. The dryer unit of claim 20, wherein the at least one light source is an LED light strip.

* * * * *